United States Patent
Govezensky et al.

(10) Patent No.: US 10,365,728 B2
(45) Date of Patent: Jul. 30, 2019

(54) ADAPTIVE PROVISION OF CONTENT BASED ON USER RESPONSE

(71) Applicant: Intel Corporation, Santa Clara, CA (US)

(72) Inventors: Yosi Govezensky, Nofit (IL); Raanan Yehezkel, Kiryat Ekron (IL); Michal Jacob, Haifa (IL)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 14/737,038

(22) Filed: Jun. 11, 2015

(65) Prior Publication Data

US 2016/0364012 A1    Dec. 15, 2016

(51) Int. Cl.
   *G06F 3/03*     (2006.01)
   *G06K 9/00*     (2006.01)
   *G06F 3/01*     (2006.01)

(52) U.S. Cl.
   CPC ............ *G06F 3/0304* (2013.01); *G06F 3/017* (2013.01); *G06K 9/00302* (2013.01); *G06F 3/013* (2013.01)

(58) Field of Classification Search
   CPC ................ G06F 3/013; H04N 21/4756; H04N 21/21805; G06K 9/00711
   See application file for complete search history.

(56) References Cited

U.S. PATENT DOCUMENTS

| 9,138,652 | B1 * | 9/2015 | Thompson | H04N 21/2358 |
| 2004/0261127 | A1 * | 12/2004 | Freeman | G03C 1/26 725/135 |
| 2012/0117017 | A1 * | 5/2012 | Phillips | H04N 21/44204 706/50 |
| 2012/0324492 | A1 * | 12/2012 | Treadwell, III | H04H 60/45 725/10 |
| 2014/0267771 | A1 * | 9/2014 | Lawler | G06K 9/00597 348/169 |

* cited by examiner

*Primary Examiner* — Michael A Faragalla
*Assistant Examiner* — Chayce R Bibbee
(74) *Attorney, Agent, or Firm* — Schwabe, Williamson & Wyatt, P.C.

(57) ABSTRACT

Apparatuses, methods, and storage media for adaptive provision of content are described. In one instance, the apparatus may comprise a processor and an adaptive content provision module to be operated by the processor. The adaptive content provision module may include a content provision module to generate and provide for display a first view of content captured by first selected one or more of cameras, to a plurality of user devices; an analysis module to receive and analyze user response information provided by the plurality of user devices in response to the displayed first view of content; and a control module to control the content provision module to generate a second view of content captured by second selected one or more of the plurality of cameras, based at least in part on a result of the analysis of the user response information. Other embodiments may be described and claimed.

18 Claims, 5 Drawing Sheets

ADAPTIVE PROVISION OF CONTENT BASED ON USER RESPONSE

TECHNICAL FIELD

The present disclosure relates to the field of content provision, and in particular, to adaptive provision of content based on user response.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Traditional systems of real-time content provision, such as broadcast TV of live sports, concerts, and news, may usually be able to provide content to users captured from different viewpoints (views). A view may include, for example, in a sports game, one of multiple cameras shooting from multiple angles, zoom in or out, slow motion, replay, and game statistics. In order to set the best view for users (e.g., viewers of the displayed content), a human director may manage the selection of content (i.e., which view) provided to user devices operated by the users.

These broadcast systems may have limited or no feedback from users and may not be adaptive in real time. Lack of feedback from users may place great responsibility on the human operator, who may need to make decisions in real time and assess the best content view that may interest the users. Further, a human operator may add latency to content provision that may tamper users' experience. Also, in the absence of user feedback, the broadcast systems may provide the same view to all the users. Accordingly, users, who by nature may have different viewing preferences, e.g., due to differences in mood, culture, age, geographic location, and the like, may be forced to accept the common view of content as set by the human operator.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
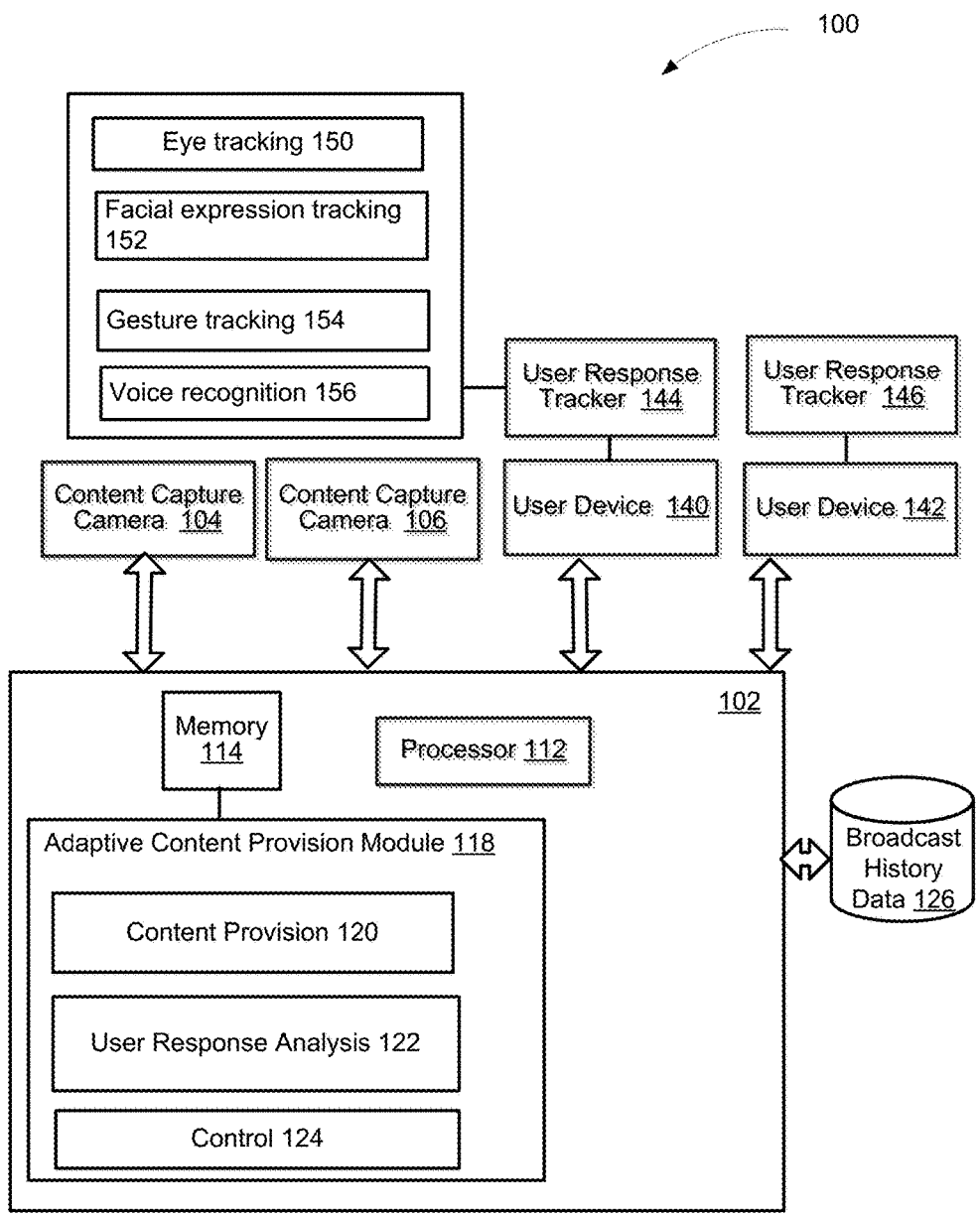
FIG. 1 is a block diagram illustrating an example system for adaptive provision of content, in accordance with various embodiments of the present disclosure.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Computing systems, apparatuses, methods, and storage media for adaptive provision of content are described herein. In one instance, the apparatus for adaptive provision of content may comprise a processor and an adaptive content provision module to be operated by the processor. The adaptive content provision module may include a content provision module to generate and provide for display a first view of content captured by first selected one or more of a plurality of cameras, to a plurality of user devices. The adaptive content provision module may further include an analysis module to receive and analyze user response information provided by the plurality of user devices in response to the displayed first view of content. The adaptive content provision module may further include a control module to control the content provision module to generate a second view of content captured by second selected one or more of the plurality of cameras, based at least in part on a result of the analysis of the user response information.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "logic" and "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram illustrating an example system 100 for adaptive provision of content, in accordance with various embodiments. As illustrated, the system 100 may include a computing apparatus 102. The apparatus 102 may include a processor 112, a memory 114, and an adaptive content provision module 118 that may be stored in the memory 114 and that may be executable on the processor 112. The above mentioned components may be communicatively coupled with each other. The apparatus 102 may be any one of a number of servers or clusters of servers known in the art.

The system 100 may further include content capture devices (e.g., cameras or other content capture-enabled devices) 104, 106 may be coupled with the apparatus 102 to capture views of content, such as real-time content. Content may include, for example, live events, such as sport events (e.g., hockey or soccer games), music events, concerts, shows, theater performances, and the like. In other embodiments, the content may be pre-recorded and remixed before its provision to the user devices in accordance with the present disclosure.

The techniques for adaptive provision of content may be applied to real- or near-real time content, as well as pre-recorded content. However, for ease of understanding, the remaining description will nominally refer to "content" as real-time content, and the content capture devices 104, 106 as cameras, but the description is to also cover near-real time content and pre-recorded content. While two cameras 104, 106 are shown in FIG. 1 for illustration purposes, it will be understood that any number of cameras (e.g., a plurality of cameras) may be associated with the system 100 described herein The apparatus 102 may be configured to facilitate the broadcast of content captured by cameras 104, 106 to user devices 140, 142, which may be a part of the system 100. The user devices 140, 142 may be operated by respective users (not shown). The user devices 140, 142, may be any devices capable of rendering for display the broadcasted content provided by the apparatus 100. For example, the user devices 140, 142 may include television sets, laptops, desktops, mobile devices, tablet computers, or the like. In embodiments, the user devices 140, 142 may include (e.g., may be communicatively coupled with) user response trackers (144 and 146 respectively) configured to track user response information, e.g., user feedback provided in response to the provided/displayed content. While two users devices 140, 142 are shown in FIG. 1 for illustration purposes, it will be understood that any number of user devices (e.g., a plurality of user devices) may be associated with the system 100 described herein.

Cameras 104 and 106 may be peripherally attached or integrated into apparatus 102. Cameras 104, 106 may be communicatively coupled with apparatus 102 via a wired or wireless connection suitable for transmitting data captured by cameras 104, 106. Generally, cameras 104, 106 may have two-dimensional (2D) or three-dimensional (3D) image capture capabilities and may be embodied as a 3D camera, depth camera, or bifocal camera, and/or be otherwise capable of generating a depth image, channel, or stream of images. Cameras 104, 106 may include a still camera, a video camera, a webcam, an infrared (IR) camera, or other device capable of capturing video and/or images of content.

Apparatus 102 may be configured to receive the different views of content captured by the cameras 104 and 106 and provide the captured content to user devices 140, 142 for display. For example, the adaptive content provision module 118 may include a content provision module 120 to generate and provide for display a view (e.g., first view) of content captured by one or more of a plurality of cameras 104, 106 to a plurality of user devices 140, 142. For example, the view of content may include a live broadcast of a hockey game. The view of content may include a view of a player moving across the rink with the puck, followed and captured by one of the cameras 104, 106, to be provided to the user devices 140, 142 for display to the respective users. The view of content may also be a composite view of a number of views captured by different cameras.

User response to the displayed view of content may include different forms, such as a change in the user's eye gaze focused on a particular object in the displayed view of content, verbal interaction (e.g., with him- or herself or with other users in the vicinity), a change of facial expression (e.g., a grimace), gestures, a change of the user's posture, a change of the user's head pose, or a combination thereof. It should be understood that the user response to the displayed view of content may be spontaneous and unintentional, and may be captured by the user response trackers 144, 146. For example, the user response trackers 144, 146 associated with the user devices 140, 142 may be configured to receive, pre-process (e.g., digitize and timestamp) user response information and provide the pre-processed information for further processing and analysis described below. The user response trackers may include one or more components configured to track and process the above-described or other types of user response to the displayed view of content.

For example, the user response tracker 144 may include an eye tracking component 150, facial expression tracking component 152, gesture tracking component 154, and voice recognition component 156. The above-noted components are shown in FIG. 1 as associated with user response tracker 144 for purposes of description. It will be understood that any user response tracker e.g., 146, may include these or other components. The described components of the response tracker 144 are provided for illustrative purposes and do not limit the capabilities of the response tracker 144 to the ones described herein. In different embodiments, the user response tracker may include more or fewer components configured to track user response to the displayed view of content.

The eye tracking component 150 may be configured to track the user's gaze directed to the displayed view of content and provide eye tracking information regarding changes in the user's gaze with respect to an object or objects in the displayed view of content to the adaptive content provision module 118 for further analysis, as described below in greater detail.

The facial expression tracking component 152 may be configured to track facial expressions of the user (e.g., mouth movement), detect facial expression changes, record facial expression changes, and provide the recorded information to the adaptive content provision module 118 for further interpretation of the changes in the user's facial expression in relation to particular objects in the displayed view of content.

The gesture tracking component 154 may be configured to track gestures provided by the user in relation to particular objects in the displayed view of content, and provide the tracked information to the adaptive content provision module 118 for further analysis.

The voice recognition component 156 may be configured to track user audio reaction (e.g., commands, exclamations, expressions, dialog with other users present and the like) to the displayed view of content, and provide the tracked information to the adaptive content provision module 118 for further analysis. Gestures, alone or in combination with other indications of user response, such as audio narrative, may serve as indications of a user's emotions, which may help to manipulate the view of content in response to these indications, as described below.

To enable the above-described user response tracker capabilities, the user device 140 may be equipped with different hardware and software components. For example, a user response capture camera (not shown) may be placed in or around the user device 140 to face the user of the user device in order to capture a facial expression of the user, gestures, and/or changes in posture, pose, eye gaze, and the like.

In some embodiments, the user response tracker 144, in addition or in the alternative to the user response capture camera, may include a plurality of sensors (not shown) to track indications of user response to rendered content. The sensors may include proximity sensors, inertial sensors, optical sensors, light sensors, audio sensors, temperature sensors, thermistors, motion sensors, vibration sensors, microphones, cameras, and/or other types of sensors. The user response tracker 144 may gather, pre-process, and communicate data provided by the user response capture camera and/or sensors associated with the respective user device 140. In embodiments, the user response tracker capabilities (e.g., user response information processing functions) may be distributed between the user devices 140, 142 and the apparatus 102.

In summary, user response information gathered and pre-processed by the user response trackers 144, 146 associated with respective user devices 140, 142 may be provided to the apparatus 102, e.g., to adaptive content provision module 118 for further processing. The adaptive content provision module 118 may include a user response analysis module 122 to receive and analyze user response information provided by the user devices 140, 142 (gathered by the respective user response trackers 144, 146) in response to the displayed (first) view of content.

For example, the user response analysis module 122 may analyze eye tracking data received from the user response trackers 144 and 146. The eye tracking data may comprise eye movement patterns of at least some of users of the user devices 140, 142. Based on a result of the analysis of the eye movement patterns, the user response analysis module 122 may determine one or more gaze points associated with the view of content displayed on the user devices 140, 142.

The user response analysis module 122 may identify one or more groups of user devices 140, 142, based at least in part on the determination of the one or more gaze points. For example, one group of users corresponding to a first group of user devices may be determined to focus on a gaze point (corresponding to an object in the view of content), and another group of users corresponding to a second group of user devices may be determined to focus on another gaze point (corresponding to another object in the displayed view of content). The identification of groups of users may occur in an unsupervised manner, such as by automatic detection of user clusters. In some embodiments, the identification of groups of users may occur in a supervised manner. For example, some users may be looking at point A in the content, while other users may be looking at point B in the content, where A and B may be pre-determined points or objects in the content that may be identified by the broadcast director or automatically, e.g., with object recognition using common computer vision algorithms.

Figure 2:
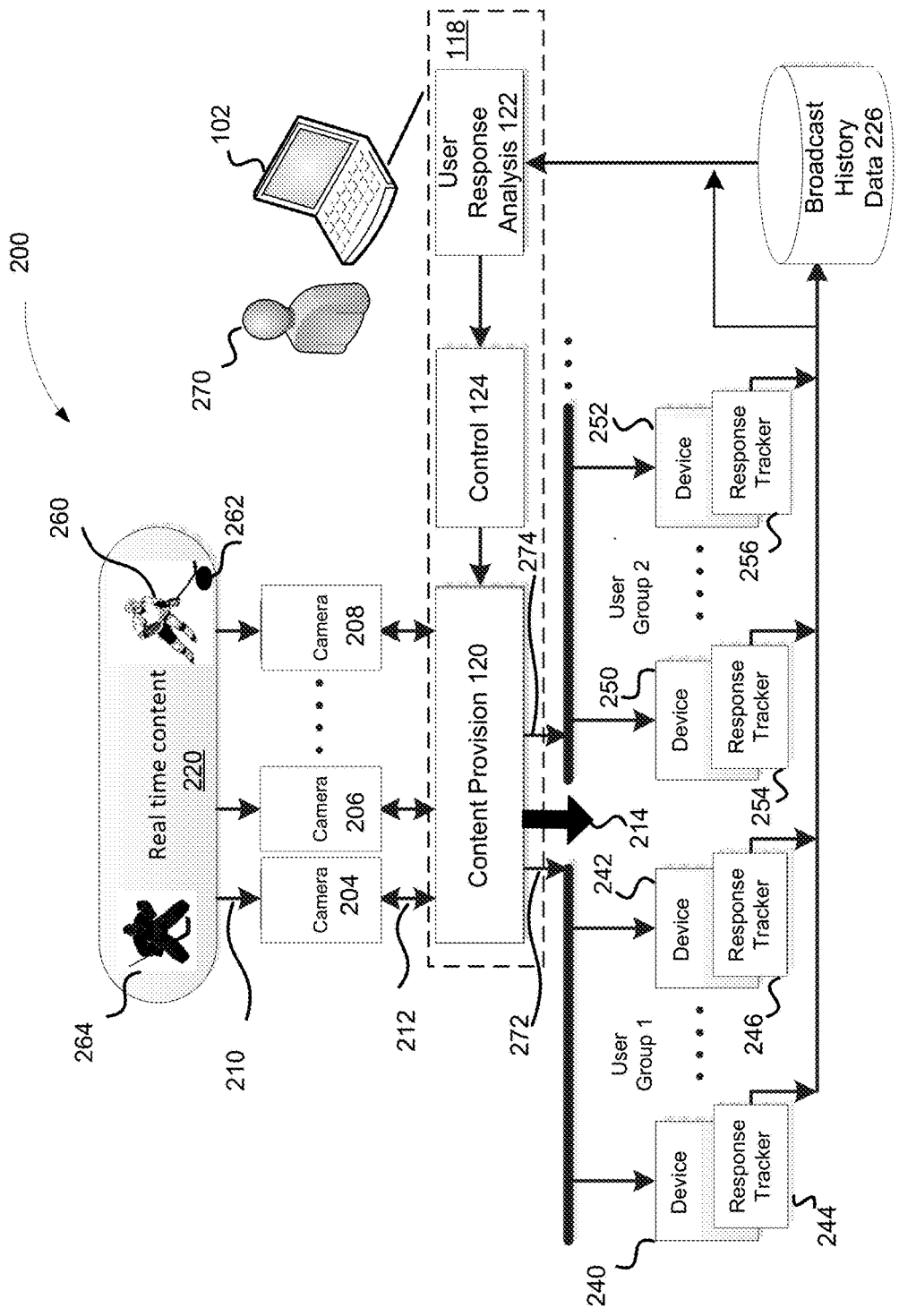
FIG. 2 illustrates an example computing environment suitable for practicing aspects of the present disclosure, in accordance with various embodiments of the present disclosure.

In another example, the user response analysis module 122 may analyze user facial expressions, voice narratives, gestures, and other indications of the user response provided by the user devices 140, 142, to enable modification of the view of the content based on the analyzed user response and user device group modification as described in reference to FIG. 2 in greater detail.

In embodiments, the user response analysis module 122 may identify one or more (e.g., first and second groups) of user devices 140, 142, based on facial expression information, gesture information, or voice feedback information, gathered and provided by the user devices 140, 142, as described in reference to FIG. 2 in greater detail.

In embodiments, the user response analysis module 122 may be configured to identify the groups of user devices based on broadcast history information that may be stored in a broadcast history data store 126 accessible by the apparatus 102. The history information may contain historic data associated with broadcasting of different types of events (e.g., concerts, games, etc.), different locations (e.g., cities, stadiums, arenas, concert halls, etc.), different participants of broadcasted events (e.g., tennis players, singers, performers, theater troupes, etc.), and the like. The history information may further include, in addition or in the alternative to that discussed above, historical user response data and its corresponding content. For example, historical data may include records of a user gazing at point of type "A" (e.g., goal keeper) in the content (e.g., hockey game), and the associated camera parameters may include zoom information, angle information, time/date, and so on. The apparatus 102 (e.g., adaptive content provision module 118 and more specifically user response analysis module 122) may be configured to access the data store 126 and retrieve relevant information, e.g., information about events that may have one or more characteristics in common with the event (content) that is or will be broadcasted. The user response analysis module 122 may be configured to analyze the retrieved information and identify groups of users, for example, prior to the broadcasting of content. For example, based on the retrieved historic data, the user response analysis module 122 may be configured to make predictions about the user behavior associated with the broadcasted event, and based on the predicted user behavior, make a predictive determination about a tentative division of audience of the broadcasted event into different user groups.

The adaptive content provision module 118 may further include a control module 124 to control the content provision module 120 to generate another (second) view of content captured by one or more of the cameras 104, 106, based at least in part on a result of the analysis of the user response information by the user response analysis module 122 discussed above. The cameras used to capture the second view of content may be the same as the ones to capture the first view of content, or different.

In some embodiments, the second view of content may include a view generated based on the user response analysis, which may not have resulted in a division of user devices into groups of user devices. For example, the second view of content may be generated having a focus on a particular object in the content that was determined to be an object of interest to a number of users above a threshold. The view may be modified by zooming the camera in or out, changing the camera's angle, providing different motion rates (e.g., slow motion), and including captions, advertisements, inserted views of other objects in the content, augmented reality elements, and the like.

For example, the generation of the second view of content may include changing focus of at least one of the cameras 104, 106, zooming one or more of the cameras 104, 106, or changing position of at least one of the cameras 104, 106. The above changes may be provided based at least in part on the determination of the one or more gaze points. For example, one or more of the cameras 104, 106 may be moved to focus on (e.g., follow) an object (e.g., player, ball, net, and the like) in the rendered content that is associated with the determined gaze point.

In some embodiments, the second view of content may include a view generated based on the user response analysis, which may have resulted in a division of user devices into groups of user devices as briefly described above. More specifically, the generated second view of content may be tailored to identified groups of users, in response to the identification of different user device groups. Accordingly, a view of content generated for one determined group of user devices may be different than the view of content generated for another group of user devices, as described in reference to FIG. 2 in greater detail. The control module 124 may be further configured to route the generated views of content to the respective groups of user devices.

It should be appreciated that, in some embodiments, any or all of the illustrated components of the system 100 may be separate from and remote to, but communicatively coupled with, the apparatus 102. In general, some or all of the functionalities of the apparatus 102, such as processing power and/or memory capacity, may be used or shared with the adaptive content provision module 118. Furthermore, at least some components of the adaptive content provision module 118 may be accessible by (e.g., communicatively coupled with) the apparatus 102, but may not necessarily reside on the apparatus 102. One or more of the components mentioned above may be distributed across the apparatus 102 and/or reside on a cloud computing service to host these components. Additionally, in some embodiments, one or more of the illustrative components may be incorporated in, or otherwise form a portion of, another component. For example, the memory 114, or portions thereof, may be incorporated in the processor 112 in some embodiments. It will be understood that adaptive content provision module 118 may comprise hardware, software (e.g., stored in memory 114), or a combination thereof.

In summary, the example system 100 may provide for a way for closing the broadcast-user feedback loop in real or near-real time, and further provide real or near-real time crowdsourcing capability for broadcasting the content (as opposed to crowdsourcing by integration over time), by analyzing user response (e.g., eye-tracking data) to the displayed content that may be obtained from the user devices equipped with user response tracking capabilities in real- or near-real time. The view of content may be modified based on the analysis results and provided to the user devices operated by the users viewing the content. The described system is configured to extract, in a live crowdsourcing manner, insights regarding the users' interests and preferences vis-à-vis displayed content and thus may enable to react in real or near-real time to provide specialized and tailored views of the content to users. Further, the example system 100 may provide for clustering the users into different user groups (e.g., fans of different teams) in real- or near-real time and to route the tailored view of content to each user group. The user groups may be formed and dissolved dynamically and in real- or near-real time. Some examples of operation of system 100, e.g., identification of groups of user devices and corresponding provision of views of content tailored to identified groups, will be described in reference to FIGS. 2-3.

FIG. 2 illustrates an example computing environment 200 suitable for practicing aspects of the present disclosure, in accordance with various embodiments of the present disclosure. More specifically, computing environment 200 illustrates system 100 of FIG. 1 in operation, in accordance with various embodiments of the present disclosure. Accordingly, at least some of the components of the computing environment 200 may correspond to the components of system 100 of FIG. 1. Computing environment 200 may include apparatus 102, such as a computing device that may be configured to access the adaptive content provision module 118. Computing environment 200 may further include a plurality of content capture cameras 204, 206, 208 coupled with the apparatus 102. For example, cameras 204, 206, 208 may be positioned around a field, stage, or rink of a facility (e.g., stadium, arena, or theater) and peripherally attached to the system 100.

The content capture cameras 204, 206, 208 may capture 210 content 220, such as real-time content, and provide 212 the captured content 220 to the adaptive content provision module 118 for processing and analysis as described in reference to FIG. 1. More specifically, the content provision module 120 may generate and provide 214 a first view of the captured content to a plurality of user devices 240, 242, 250, 252 for display to users. User devices 240, 242, 250, 252 may be equipped with display devices (not shown) and may further include respective user response trackers 244, 246, 254, 256 for tracking, capturing, and pre-processing user response to the displayed first view of content 220. As described above, user devices may include any devices capable of displaying content 220 (e.g., real-time content) to the users. Continuing with the hockey game example of FIG. 1, the first view of content 220 provided to the users of user devices 240, 242, 250, 252 may be a view of the ice hockey rink with players commencing a hockey game.

The user response trackers 244, 246, 254, 256 may capture user response to the displayed content and provide the captured user response information to the adaptive content provision module 118 (e.g., user response analysis module 122) for analysis. As mentioned above, the users may express their reaction to the displayed content in a variety of ways. For example, the users may use eye movement, hand gestures, voice narrative, facial expressions, or combinations thereof. Accordingly, user response information may include information about users' personal modalities, such as eye gaze, posture, position relative to the user device, head pose, facial expression, hand gestures, audio expressions, and the like.

In embodiments, user response information, e.g., along with provided content view, may be provided to a broadcast history data store for predictive analysis, as described below in greater detail.

The user response analysis module 122 may receive and analyze user response information provided by the plurality of user devices in response to the displayed first view of content. More specifically, the user response analysis module 122 may analyze eye tracking data received from the user response trackers 144 and 146. The eye tracking data may comprise eye movement patterns of at least some of users of the user devices 140, 142. Based on a result of the analysis of the eye movement patterns, the user response analysis module 122 may determine one or more gaze points associated with the view of content displayed on the user devices 140, 142. Based on the determined gaze points, objects of interests to users in the view of content may be identified.

For example, the user response analysis module 122 may identify one or more (e.g., first and second groups) of user devices 140, 142, based at least in part on the determination of the one or more gaze points. For example, the first group of users corresponding to the first group of user devices may be determined to focus on a first gaze point, and a second group of users corresponding to the second group of user devices may be determined to focus on a second gaze point in the displayed view of content. The first and second gaze points may correspond to different objects (e.g., first and second objects) in the view of content displayed on the user devices 140, 142.

For example, if a hockey game is being broadcasted, the first object may be a player 260 with the puck 262 moving across the rink, and the second object may be a goalie 264 trying to defend the net against the player 260 with the puck 262. Accordingly, the first group of users may focus on the player 260 with the puck 262, and the second group of users may focus on the goalie 264 defending the net from the player 260 with the puck 262.

A group of user devices may be determined based on a number of user devices associated with the user focus on a particular gaze point (and corresponding object or objects in the displayed content). If the number of user devices exceeds a particular threshold, a determination about a forming of a user group (and corresponding user device group) may be made.

The users may be divided into groups in dynamic fashion, e.g., periodically or spontaneously as the displayed content and corresponding user responses change in real- or near-real time. To enable the group identification, the user response analysis module 122 may be configured to apply a machine-learning clustering method (algorithm) to respective spatial layouts of the identified gaze points, to determine objects in the content that are associated with the determined gaze points for a number of users, and identify the groups of user devices based on this information.

In another example, a computer-vision method (algorithm) may be applied to the content to determine the object in the content that is of interest to users (e.g., users associated with respective user devices). The object may be determined based on the identified gaze points. For example, in a hockey game broadcast, the computer vision algorithm may identify the color of the uniform of the player that drew attention (gazes) of the users of user devices. If a number of user devices reporting the user interest to the object in the content is determined to be above a predetermined threshold, a corresponding group of user devices may be identified.

In another example, the computer vision algorithm enhanced with scene understanding capabilities may be applied to the displayed content to enhance and improve the insights extracted from the analysis of eye-tracking data. For example, if the users fixate on a specific moving target, e.g., player 260, a scene understanding algorithm may be applied to detect whether the users are looking at the puck 262 led by the player 260, or at the torso of the player 260. Depending on that determination, the user response analysis module 122 may provide information to control module 124 to control the content provision module 120 to generate a second view of content 220, such as a slow motion view of the puck 262 or a wide angle (zoomed-out) view of the player 260. This approach may reduce or eliminate the need for human intervention of a human operator 270 of the apparatus 102, thus reducing or eliminating latency associated with human intervention.

In another example, the user response analysis module 122 may determine that some users of user devices 240, 242, 250, 252 (a number of whom is above a threshold) are focused on the player 260 (e.g., of team A) moving toward the net of team B, while other users of user devices 240, 242, 250, 252 (a number of whom is also above a threshold) are focused on the goalie 264 of team B. Accordingly, the user response analysis module 122 may divide the audience, e.g., users of user devices 240, 242, 250, 252 into two groups: a first user group (group 1) associated with user devices 240, 242 that is focused on the player 260, and a second user group (group 2) associated with user devices 250, 252 that is focused on the goalie 264.

The user response analysis module 122 may communicate this information to the control module 124 to direct the content provision module 120 to generate a second view of content 220 that may include two different views: one view tailored to group 1, and another view tailored to group 2. The view tailored to group 1 (third view) may focus on the player 260, having the goalie 264 in the background; while the view tailored to group 2 (fourth view) may focus on the goalie 264 having the player 260 on the background. The views may be provided by different cameras, e.g., shooting the ice hockey rink from different angles. The content provision module 120 may route 272 the third view to group 1 (devices 240, 242), and route 274 the fourth view to group 2 (devices 250, 252), as shown.

In another example, in addition or in the alternative to the examples described above, the user response analysis module 122 may analyze user facial expressions, voice narratives, gestures, and other indications of the user response provided by the user devices 140, 142 to provide additional determination regarding users' preferences, taste, emotions, and the like in relation to the displayed view of content 220. Analysis of information about some or all of the above factors may help determine interests, preferences, or emotions pertaining to particular users (e.g., due to differences in age, culture, geographic location, moods, and the like) in association with the displayed view of content. Such analysis may ultimately help identify user groups and corresponding groups of user devices.

For example, a group of user devices may be determined based on a number of user devices associated with a particular user preference or emotion. The preference or emotion may be determined to be associated with an object or objects in the displayed view of content, and may be derived from the facial expression, gesture, or voice information provided by the user device. To facilitate the user preference and/or emotions determination, the user response analysis module 122 may include rules configured to determine preferences and/or emotions from the facial expression, gesture, or voice information, based on, for example, heuristics.

For example, some users may exclaim, in response to the displayed first view of content 220: "Look at player A (e.g., player 260)! Great move!" Other users may exclaim, in response to the displayed first view of content 220: "Great save, goalie B (e.g., goalie 264)!" Accordingly, based on this response, the user response analysis module 122 may include the former users in the user group 1, and include the latter users in the user group 2.

In another example, users may gesture toward a particular object in the displayed content (e.g., a player or a puck, for example). The user response analysis module 122 may interpret the gesture as expression of interest in the particular object, and provide the control module 124 with this information to direct the content provision module 120 to generate a view of content 220 with a focus on the object of interest.

In another example, users, for example, in combination with gaze fixation on a particular object in the content 220, may provide body language or a facial expression that may reinforce their preference (positive or negative) toward the object. For example, the user's face may express an outrage, disappointment, excitement, and the like emotion that may be attributed to a particular object (e.g., player 260) in the displayed view of content 220. The user response analysis module 122 may interpret the detected emotion as an expression (e.g., an additional expression) of interest in the particular object and advise the control module 124 accordingly.

In another example, the user response analysis module 122 may access the broadcast history information 226 to analyze users' behavior (e.g., interests, preferences, and the like) in relation to content with similar characteristics (e.g., a game with the same participant team or teams, game in the same arena, and the like). User behavior may include, for example, a specific facial expression, head movement, eye-gaze change and its frequency, and/or combination thereof, in response to a content event (e.g., goal scored by the user's favorite team).

Such predictive analysis may result in tentative (e.g., prior to content broadcasting) identifications of user groups among the users of user devices 240, 242, 250, 252 according to the history of user behavior associated with the similar content. For example, if an event to be broadcasted is a hockey game involving particular teams, the user response analysis module 122 may retrieve historic data associated with the prior games between these teams, or prior games involving one of the teams, or a location (e.g., arena) where the event would take place, or the like. To provide such predictions, the user response analysis module 122 may be configured, for example, with a prediction algorithm suitable for executing predictive analysis as described herein.

If the game is between teams belonging to different locales (e.g., cities or countries), the user response analysis module 122 may predict that users of one locale (e.g., city A) will likely be focused on "their" team A, while the users of another locale (e.g., city B) will likely be focused on "their" team B. Accordingly, the users (and their respective user devices) may be divided into at least two groups, each group focused on its own team or particular (e.g., favorite) players of the team.

While the above examples describe, for illustration purposes, identification of two user groups among users of user devices 240, 242, 250, 252, multiple user groups may be identified using techniques described in the present disclosure. Accordingly, multiple corresponding views of content targeting these groups may be generated using techniques of the present disclosure. In embodiments, the views may include advertisements targeting specific audiences based on the analysis provided by the user response analysis module 122.

In embodiments, the described techniques may be expanded to include a "live" audience watching real-time content 220 (e.g., a hockey game at the venue (e.g., stadium)). Additional improvements to the system 100 may be made in order to include a "live" audience. For example, additional response trackers may be associated with content capture devices (e.g., cameras 204, 206, 208) in order to track the user responses of the "live" audience, in addition to tracking the responses of users of user devices 240, 242, 250, 252.

In another example, the described techniques may be applied to "reality TV" in order to help users "take" the camera to their personal interest, for example, follow the character they like, or the action that caught their eyes.

In another example, a view of content may be generated and routed to some (or all) users in order to see changes in their response and not necessarily to improve satisfaction of the users. This may be used by the environment 200 as a stimulating or probing method to better understand user preferences. For example, the environment 200 may generate two different views, and measure users' response for each view. The difference between responses may aid the environment 200 in adaptive generation of views of content and also to better divide the users into sub-groups.

As briefly discussed above, in some embodiments, the environment 200 may include the human operator 270 to operate apparatus 102. For example, the generation of views of content to display may serve as a recommendation to a human broadcast director, such as human operator 270. For example, several candidate views, sorted (e.g., ranked) in a descending score, may be provided to the human operator 270. The human operator 270 may manually select one or more views from the provided candidate views list to be broadcasted. This way, mistakes of the system (e.g., apparatus 100) may be corrected by the human operator 270.

In another example, the human operator 270 may divide users into groups, based on the extracted information about users. For example, the human operator 270 may divide users according to the team they are in favor of. In another example, if the human operator 270 may show a slow motion of a puck pass (in a hockey game situation), and may share that view with people who tend to look globally at the rink during a puck pass, compared to people who may gaze only at the puck receiver.

As briefly discussed above, in embodiments, content may be pre-recorded and remixed before its provision to the user devices. In embodiments, a customizable view of recorded broadcasts may be created. For example, a customizable replay of an event may be generated, assuming the replay includes a number of recorded feeds. For example, a replay of a soccer game may be generated using techniques described herein. The camera may follow the user's interest (assuming that there exists a recorded video feed that includes content views in which the user may be interested. In some scenarios, a "customized view" may be a fusion of multiple views and sensors, e.g., fusing multiple cameras views to form a 3D reconstructed scene and then provide a new angle of the scene, based on recorded user response, e.g., eye gaze and movement pattern.

Figure 3:
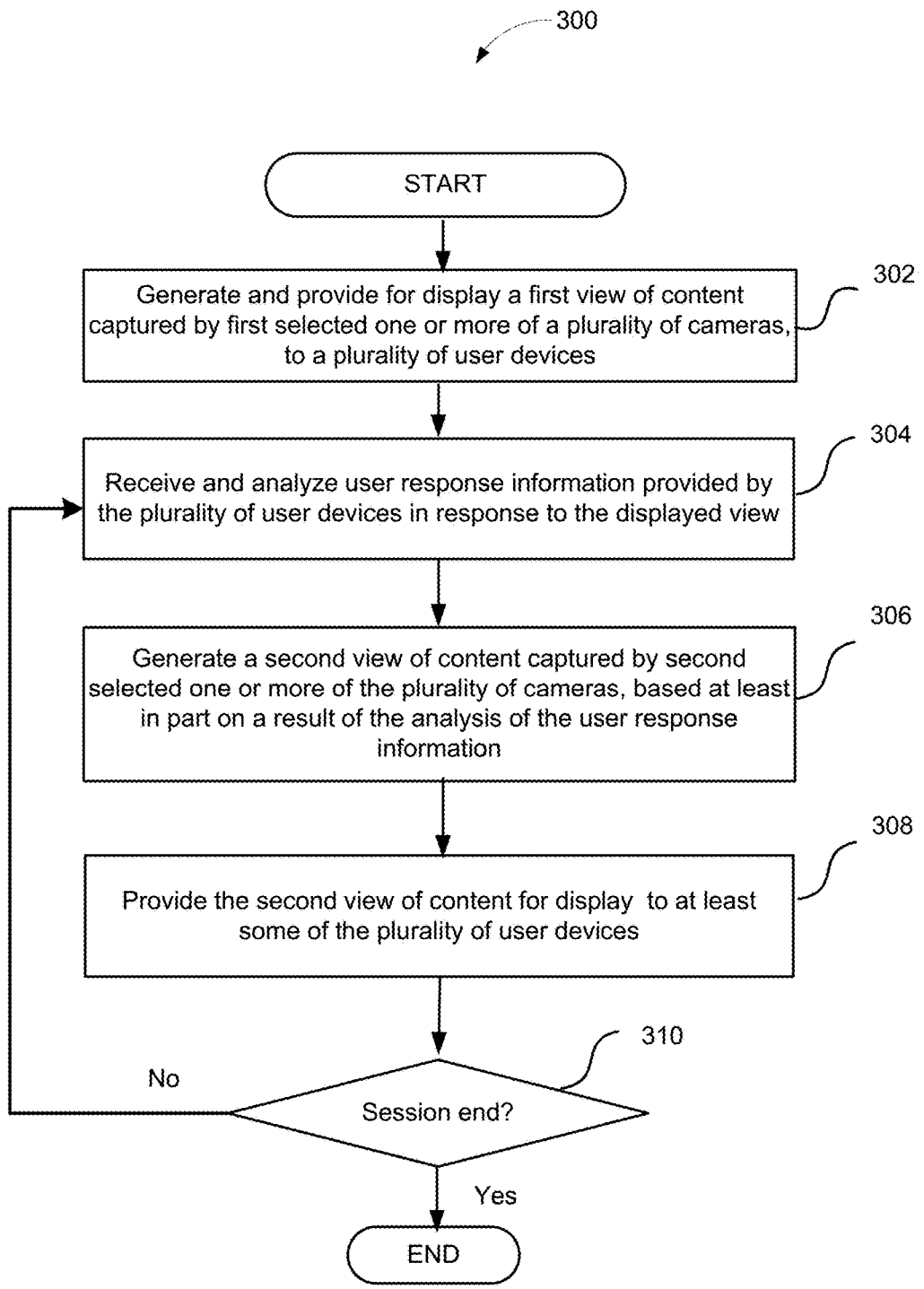
FIG. 3 illustrates an example process for adaptive provision of content, in accordance with some embodiments.

FIG. 3 illustrates an example process for adaptive provision of content, in accordance with some embodiments. The process 300 may be performed, for example, by the apparatus 102 (e.g., computing device) configured with adaptive content provision module 118 described in reference to FIGS. 1 and 2.

The process 300 may begin at block 302, and include generating and providing for display a first view of content captured by first selected one or more of a plurality of cameras, to a plurality of user devices. As described in reference to FIGS. 1-2, the content capture cameras may capture content (e.g., a live event) and provide the captured content to the adaptive content provision module for broadcasting, e.g., generating a first view of content and providing that view to the user devices.

At block 304, the process 300 may include receiving and analyzing user response information provided by the plurality of user devices in response to the displayed first view of content. In embodiments, user response information may include user data that may contain user response information as described above. More specifically, the process 300 may include analyzing eye tracking information that comprises eye movement patterns of at least some of users associated with the user devices. The process 300 may further include identifying one or more gaze points associated with the displayed view of content, based at least in part on a result of analyzing the eye movement pattern. The process 300 may further include identifying first and second groups of user devices of the plurality of user devices based at least in part on a result of the identifying the one or more gaze points.

The process 300 may further include analyzing historic data associated with prior broadcast of content having one or more characteristics in common with the content that is currently broadcasted. Identifying groups of user devices may be further based on a result of historic data analysis.

In some embodiments, the process 300 may further include analyzing one or more of: facial expression information, gesture information, or voice feedback information. Identifying groups of user devices may be further based on a result of the analysis of the one or more of: facial expression information, gesture information, or voice feedback information.

At block 306, the process 300 may include generating a second view of content captured by second selected one or more of the plurality of cameras. The cameras providing the second view of content may be the same as the cameras providing the first view of content, or different. For example, the first view of content may be generated based on the information provided by one of the cameras, and the second view of content may be generated based on the information provided by another one of the cameras. In embodiments, generating a second view of content may include generating additional views, e.g., a third view of content for provision to the first group of user devices, a fourth view of content for provision to the second group of user devices, and so forth.

At block 308, the process 300 may include providing the second view of content for display to at least some of the plurality of user devices. For example, the third view of content may be provided to the first group of user devices, the fourth view of content may be provided to the second group of user devices, and so forth.

At decision block 310, the process 300 may include a determination of whether the user session with the user devices (e.g., broadcasted event) has ended. If the session has not ended, the process 300 may return to block 304. Otherwise, the process 300 may end.

It should be understood that the actions described in reference to FIG. 3 may not necessarily occur in the described sequence. For example, actions corresponding to block 308 may take place substantially concurrently with actions corresponding to block 310.

Figure 4:
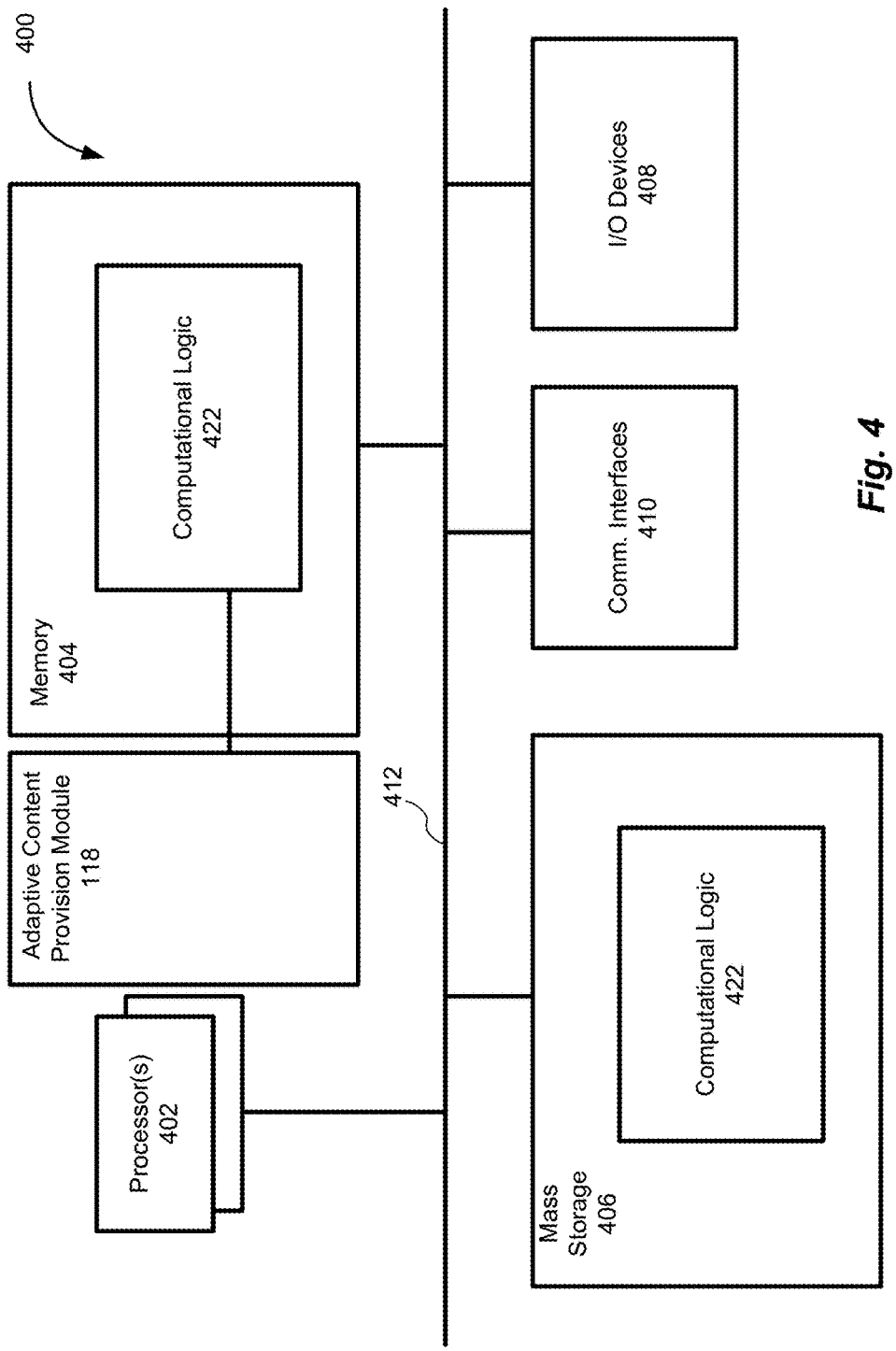
FIG. 4 illustrates an example computing system suitable for practicing various aspects of the disclosure, in accordance with various embodiments.

FIG. 4 illustrates an example computing device 400 suitable for use to practice aspects of the present disclosure, in accordance with various embodiments. For example, the example computing device 400 may be suitable to implement the functionalities of the apparatus 102. In some embodiments, the example computing device 400 may be suitable to implement the functionalities of user devices 140 (142) having user response trackers 144 (146).

As shown, computing device 400 may include one or more processors or processor cores 402, and system memory 404. For the purpose of this application, including the claims, the term "processor" refers to a physical processor, and the terms "processor" and "processor cores" may be considered synonymous, unless the context clearly requires otherwise. The processor 402 may include any type of processors, such as a central processing unit (CPU), a microprocessor, and the like. The processor 402 may be implemented as an integrated circuit having multi-cores, e.g., a multi-core microprocessor. The computing device 400 may include mass storage devices 406 (such as diskette, hard drive, volatile memory (e.g., dynamic random access memory (DRAM)), compact disc read only memory (CD-ROM), digital versatile disk (DVD) and so forth). In general, system memory 404 and/or mass storage devices 406 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 400 may further include input/output (I/O) devices 408 such as a display, keyboard, cursor control, remote control, gaming controller, image capture device, and so forth and communication interfaces (comm. INTF) 410 (such as network interface cards, modems, infrared receivers, radio receivers (e.g., Bluetooth), and so forth). I/O devices 408 when used as apparatus 102 may be suitable for communicative connections with cameras 104, 106, or user devices 140, 142. In some embodiments, I/O devices 408 when used as user devices 140, 142 may include a device necessary for implementing the functionalities of user response trackers 144, 146 described in reference to FIG. 1.

The communication interfaces 410 may include communication chips (not shown) that may be configured to operate the device 400 (or 100) in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 410 may operate in accordance with other wireless protocols in other embodiments.

The above-described computing device 400 elements may be coupled to each other via system bus 412, which may represent one or more buses. In the case of multiple buses, they may be bridged by one or more bus bridges (not shown). Each of these elements may perform its conventional functions known in the art. In particular, system memory 404 and mass storage devices 406 may be employed to store a working copy and a permanent copy of the programming instructions implementing the operations associated with apparatus 102, e.g., operations associated with providing adaptive content provision module 118 as described in reference to FIGS. 1-3 (when device 400 is used to implement apparatus 102) or operations associated with user response tracker 144/146 (when device 400 is used to implement user devices 140/142, generally shown as computational logic 422). Computational logic 422 may be implemented by assembler instructions supported by processor(s) 402 or high-level languages that may be compiled into such instructions.

The permanent copy of the programming instructions may be placed into mass storage devices 406 in the factory, or in the field, through, for example, a distribution medium (not shown), such as a compact disc (CD), or through communication interfaces 410 (from a distribution server (not shown)).

Figure 5:
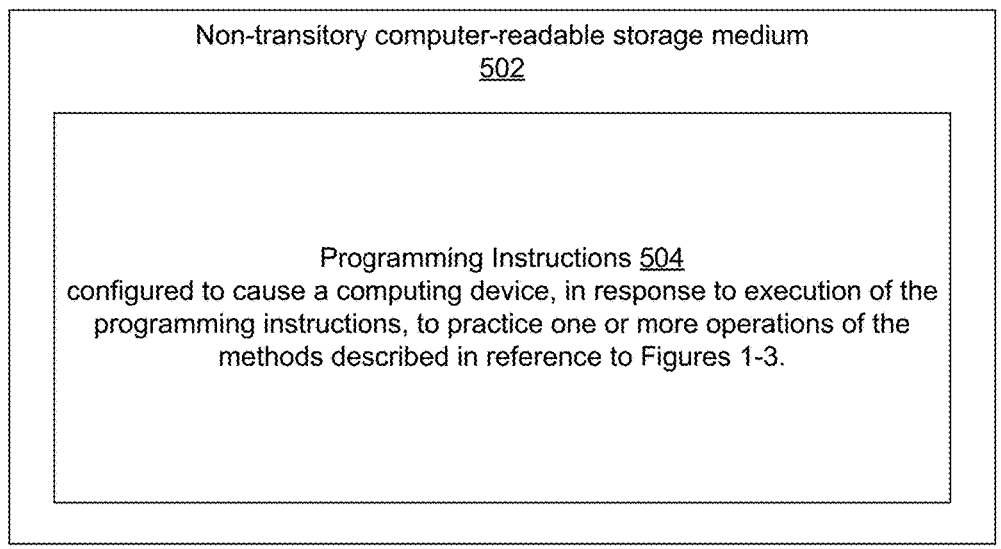
FIG. 5 illustrates an example non-transitory computer-readable storage medium having instructions configured to practice all or selected ones of the operations associated with the processes described in reference to FIGS. 1-3.

FIG. 5 illustrates an example non-transitory computer-readable storage media 502 having instructions configured to practice all or selected ones of the operations associated with the processes described above. As illustrated, non-transitory computer-readable storage medium 502 may include a number of programming instructions 504 (e.g., including adaptive content provision module 118). Programming instructions 504 may be configured to enable a device, e.g., computing device 400, in response to execution of the programming instructions, to perform one or more operations of the processes described in reference to FIGS. 1-3. In alternate embodiments, programming instructions 504 may be disposed on multiple non-transitory computer-readable storage media 502 instead. In still other embodiments, programming instructions 504 may be encoded in transitory computer-readable signals.

Referring again to FIG. 4, the number, capability, and/or capacity of the elements 408, 410, 412 may vary, depending on whether computing device 400 is used to implement apparatus 102 or user devices 140/142, and in the case of user devices 140/142, whether computing device 400 is a stationary computing device, such as a set-top box or desktop computer, or a mobile computing device, such as a tablet computing device, laptop computer, game console, or smartphone. Their constitutions are otherwise known, and accordingly will not be further described.

At least one of processors 402 may be packaged together with memory having computational logic 422 configured to practice aspects of embodiments described in reference to FIGS. 1-3. For one embodiment, at least one of the processors 402 may be packaged together with memory having computational logic 422 configured to practice aspects of process 300 of FIG. 3 to form a System in Package (SiP) or a System on Chip (SoC).

In various implementations, the computing device 400 when used to implement apparatus 102 may comprise a stand-alone server or a server of a computing rack or cluster; and when used to implement user devices 140/144, the computing device 400 may comprise a laptop, a netbook, a notebook, an ultrabook, a smartphone, a tablet, a personal digital assistant (PDA), an ultra mobile PC, a mobile phone, a desktop computer, a monitor, a set-top box, or an entertainment control unit. In further implementations, the computing device 400 may be any other electronic device that processes data.

The following paragraphs describe examples of various embodiments.

Example 1 is an apparatus for adaptive provision of content, comprising: a processor; and an adaptive content provision module to be operated by the processor, including: a content provision module to generate and provide for display a first view of content captured by first selected one or more of a plurality of cameras, to a plurality of user devices; an analysis module to receive and analyze user response information provided by the plurality of user devices in response to the displayed first view of content; and a control module to control the content provision module to generate a second view of content captured by second selected one or more of the plurality of cameras, based at least in part on a result of the analysis of the user response information.

Example 2 may include the subject matter of Example 1, wherein the apparatus includes the plurality of cameras coupled with the processor to capture content, wherein content comprises real-time content.

Example 3 may include the subject matter of Example 1, wherein the second selected one or more of the plurality of cameras is different than the first selected one or more of the plurality of cameras.

Example 4 may include the subject matter of Example 1, wherein the adaptive content provision module is to provide for display the second view of content to at least some of the plurality of user devices.

Example 5 may contain the subject matter of any of Examples 1 to 4, wherein the analysis module, as part of to receive and analyze user response information is to: receive and analyze eye tracking information provided by at least some of the plurality of user devices.

Example 6 may include the subject matter of Example 5, wherein the analysis module, as part of to receive and analyze eye tracking information, is to analyze eye tracking data that comprises an eye movement pattern of at least some of users of the user devices, and to determine one or more gaze points associated with the displayed first view of content, based at least in part on a result of the analysis of the eye movement pattern.

Example 7 may include the subject matter of Example 6, wherein the control module, as part of to control the content provision module to generate a second view of content, is to change at least one of: focus of at least one of the second selected one or more of the plurality of cameras, zoom of at least one of the second selected one or more of the plurality of cameras, or position of at least one of the second selected one or more of the plurality of cameras, based at least in part on the determination of the one or more gaze points.

Example 8 may include the subject matter of Example 7, wherein the analysis module, as part of to receive and analyze user response information, is to identify at least first and second groups of user devices of the plurality of user devices, based at least in part on the determination of the one or more gaze points.

Example 9 may include the subject matter of Example 8, wherein the analysis module, as part of to receive and analyze eye tracking information, is to analyze one or more of: facial expression information, gesture information, or voice feedback information, wherein to identify at least first and second groups of user devices of the plurality of user devices is further based at least in part on a result of the analysis of the one or more of: facial expression information, gesture information, or voice feedback information.

Example 10 may include the subject matter of Example 9, wherein the control module, as part of to control the content provision module to generate a second view of content, is to: generate a third view of content for provision to the first group of user devices; and generate a fourth view of content for provision to the second group of user devices; wherein the adaptive content provision module is to: route the third view of content for display to the first group of user devices; and route the fourth view of content for display to the second group of user devices, wherein the third and fourth views are captured by different ones of the second selected one or more of the plurality of cameras.

Example 11 may include the subject matter of Example 10, wherein the one or more gaze points include at least a first gaze point associated with the first group of user devices and second gaze point associated with the second group of user devices, wherein a first number of user devices in the first group is above a first threshold and a second number of user devices in the second group is above a second threshold.

Example 12 may include the subject matter of Example 11, wherein the analysis module, as part of to determine one or more gaze points, is to apply at least one of a machine-learning clustering algorithm or a computer-vision algorithm to respective spatial layouts of the identified first and second gaze points, to determine at least a first object in the content that is associated with the first gaze point, and determine at least a second object in the content that is associated with the second gaze point.

Example 13 may include the subject matter of Example 12, wherein the control module is to generate the third view of content based at least in part on the determination of the first object and to generate the fourth view of content is based at least in part on the determination of the second object.

Example 14 may include the subject matter of Example 8, wherein the analysis module, as part of to receive and analyze user response information, is to retrieve and analyze historic data associated with prior broadcast of content having one or more characteristics in common with the content that is currently broadcasted, wherein to identify at least first and second groups of user devices of the plurality of user devices is based at least in part on a result of the analysis of the historic data.

Example 15 is one or more computer-readable media having instructions for adaptive provision of content stored thereon that, in response to execution by a computing device, provide the computing device with an adaptive content provision environment to: generate and provide for display a first view of content captured by first selected one or more of a plurality of cameras, to a plurality of user devices; receive and analyze user response information provided by the plurality of user devices in response to the displayed first view of content; and generate a second view of content captured by second selected one or more of the plurality of cameras, based at least in part on a result of the analysis of the user response information.

Example 16 may include the subject matter of Example 15, wherein the instructions for adaptive provision of content provide the computing device with an adaptive content provision environment to: provide for display the second view of content to at least some of the plurality of user devices.

Example 17 may include subject matter of Example 15, wherein to generate a second view of content includes to: generate the second view of content captured by the second selected one or more of the plurality of cameras that is different than the first selected one or more of the plurality of cameras.

Example 18 may include the subject matter of Example 17, wherein to receive and analyze user response information further includes: analyze eye tracking information that comprises an eye movement pattern of at least some of users associated with the user devices; and identify one or more gaze points associated with the displayed first view of content, based at least in part on a result of analyzing the eye movement pattern.

Example 19 may include the subject matter of Example 18, to receive and analyze user response information further includes: retrieve and analyze historic data associated with prior broadcast of content having one or more characteristics in common with the content that is currently broadcasted.

Example 20 may include the subject matter of Example 19, wherein the instructions for adaptive provision of content provide the computing device with an adaptive content provision environment to: identify at least first and second groups of user devices of the plurality of user devices based at least in part on: a result of the analyzing the historic data and on identifying the one or more gaze points.

Example 21 may include the subject matter of Example 20, wherein to generate a second view of content includes: generate a third view of content for provision to the first group of user devices; and generate a fourth view of content for provision to the second group of user devices, wherein the instructions for adaptive provision of content provide the computing device with an adaptive content provision environment to: provide the third view of content to the first group of user devices; and provide the fourth view of content to the second group of user devices.

Example 22 is a computer-implemented method, comprising: generating and providing for display, by a computing device, a first view of content captured by first selected one or more of a plurality of cameras, to a plurality of user devices; receiving and analyzing, by the computing device, user response information provided by the plurality of user devices in response to the displayed first view of content; and generating, by the computing device, a second view of content captured by second selected one or more of the plurality of cameras, based at least in part on a result of the analysis of the user response information.

Example 23 may include the subject matter of Example 22, wherein receiving and analyzing user response information includes: analyzing, by the computing device, eye tracking information that comprises an eye movement pattern of at least some of users associated with the user devices; and identifying, by the computing device, one or more gaze points associated with the displayed first view of content, based at least in part on a result of analyzing the eye movement pattern.

Example 24 may include the subject matter of Example 23, wherein receiving and analyzing user response information includes retrieving and analyzing, by the computing device, historic data associated with prior broadcast of content having one or more characteristics in common with the content that is currently broadcasted.

Example 25 may include the subject matter of Example 24, identifying, by the computing device, at least first and second groups of user devices of the plurality of user devices is based at least in part on a result of the analyzing the historic data and on identifying the one or more gaze points; wherein generating a second view of content includes: generating, by the computing device, a third view of content for provision to the first group of user devices; and generating, by the computing device, a fourth view of content for provision to the second group of user devices.

Example 26 is an apparatus for adaptive provision of content, comprising: means for generating and providing for display a first view of content captured by first selected one or more of a plurality of cameras, to a plurality of user devices; means for receiving and analyzing user response information provided by the plurality of user devices in response to the displayed first view of content; and means for generating a second view of content captured by second selected one or more of the plurality of cameras, based at least in part on a result of the analysis of the user response information.

Example 27 may include the subject matter of Example 26, further comprising: means for providing for display the second view of content to at least some of the plurality of user devices.

Example 28 may include the subject matter of any of Examples 26 to 27, wherein means for generating a second view of content includes: means for generating the second view of content captured by the second selected one or more of the plurality of cameras that is different than the first selected one or more of the plurality of cameras.

Example 29 may include the subject matter of Example 28, wherein means for receiving and analyzing user response information further includes: means for analyzing eye tracking information that comprises an eye movement pattern of at least some of users associated with the user devices; and means for identifying one or more gaze points associated with the displayed first view of content, based at least in part on a result of analyzing the eye movement pattern.

Example 30 may include the subject matter of Example 29, wherein means for receiving and analyzing user response information further includes: means for retrieving and analyzing historic data associated with prior broadcast of content having one or more characteristics in common with the content that is currently broadcasted.

Example 31 may include the subject matter of Example 30, further comprising: means for identifying at least first and second groups of user devices of the plurality of user devices based at least in part on: a result of the analyzing the historic data and on identifying the one or more gaze points.

Example 32 may include the subject matter of Example 31, wherein means for generating a second view of content includes: means for generating a third view of content for provision to the first group of user devices; means for generating a fourth view of content for provision to the second group of user devices, means for providing the third view of content to the first group of user devices; and means for providing the fourth view of content to the second group of user devices.

Computer-readable media (including non-transitory computer-readable media), methods, apparatuses, systems, and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. An apparatus for adaptive provision of content, comprising:
   a processor; and
   an adaptive content provision module to be operated by the processor, including:
      a content provision module to generate and provide for display of a first view of content captured by first selected one or more of a plurality of cameras, to a group of user devices;
      an analysis module to, in real time, receive and crowdsource-analyze user response information provided by the group of user devices in response to the displayed first view of content, wherein the user response information comprises eye tracking information and wherein the analysis module, as part of to receive and analyze user response information, is to identify at least first and second crowdsource groups of user devices in the group of user devices, based at least in part on the eye tracking information; and
      a control module to control the content provision module to generate and display in real time to the first crowdsource group of user devices a second view of content captured by second selected one or more of the plurality of cameras and to generate and display in real time to the second crowdsource group of user devices a third view of content captured by third selected one or more of the plurality of cameras, based at least in part on a result of the crowdsource-analysis of the user response information.

2. The apparatus of claim 1, wherein the apparatus includes the plurality of cameras coupled with the processor to capture content, wherein content comprises real-time content.

3. The apparatus of claim 1, wherein the second selected one or more of the plurality of cameras is different than the first selected one or more of the plurality of cameras.

4. The apparatus of claim 1, wherein the analysis module, as part of to receive and crowdsource-analyze the user response information, comprises to analyze the eye tracking information for an eye movement pattern of at least some of users of the user devices, and to determine one or more gaze points associated with the displayed first view of content, based at least in part on a result of the analysis of the eye movement pattern.

5. The apparatus of claim 4, wherein the control module, as part of to control the content provision module to generate the second view of content, is to change at least one of: focus of at least one of the second selected one or more of the plurality of cameras, zoom of at least one of the second selected one or more of the plurality of cameras, or position of at least one of the second selected one or more of the plurality of cameras, based at least in part on the determination of the one or more gaze points.

6. The apparatus of claim 4, wherein the analysis module, as part of to receive and analyze the eye tracking information, is to identify the first and second crowdsource groups of user devices based at least in part on determination of the one or more gaze points in the eye tracking information.

7. The apparatus of claim 6, wherein the one or more gaze points include at least a first gaze point associated with the first crowdsource group of user devices and a second gaze point associated with the second crowdsource group of user devices, wherein a first number of user devices in the first crowdsource group is above a first threshold and a second number of user devices in the second crowdsource group is above a second threshold.

8. The apparatus of claim 7, wherein the analysis module, as part of to determine one or more gaze points, is to apply a machine-learning clustering algorithm to respective spatial layouts of the identified first and second gaze points, to determine at least a first object in the content that is associated with the first gaze point, and determine at least a second object in the content that is associated with the second gaze point and to identify the first and second crowdsource groups of user devices based on this information.

9. The apparatus of claim 8, wherein the control module is to generate the second view of content based at least in part on the determination of the first object and to generate the third view of content is based at least in part on the determination of the second object.

10. The apparatus of claim 1, wherein the analysis module, as part of to receive and crowdsource-analyze user response information, is to retrieve and analyze historic data associated with prior broadcast of content having one or more characteristics in common with the content that is currently broadcasted, wherein to identify at least first and second crowdsource groups of user devices of the group of user devices is based at least in part on a result of the analysis of the historic data, wherein the historic data comprises gaze point groups.

11. One or more computer-readable media having instructions for adaptive provision of content stored thereon that, in response to execution by a computing device, provide the computing device with an adaptive content provision environment to:

generate and provide for display a first view of content captured by first selected one or more of a plurality of cameras, to a group of user devices;

receive and crowdsource-analyze user response information provided by the group of user devices in response to the displayed first view of content to identify at least first and second crowdsource groups of user devices in the group of user devices based at least in part on eye tracking information in the user response information; and generate and display to the first crowdsource group of user devices a second view of content captured by second selected one or more of the plurality of cameras and to generate and display to the second crowdsource group of user devices a third view of content captured by third selected one or more of the plurality of cameras, based at least in part on a result of the crowdsource-analysis of the user response information.

12. The computer-readable media of claim 11, wherein to generate the second view of content includes to:

generate the second view of content captured by the second selected one or more of the plurality of cameras that is different than the first selected one or more of the plurality of cameras.

13. The computer-readable media of claim 12, wherein to receive and analyze user response information further includes:

analyze the eye tracking information for an eye movement pattern of at least some of users associated with the user devices; and identify one or more gaze points associated with the displayed first view of content, based at least in part on a result of analyzing the eye movement pattern.

14. The computer-readable media of claim 13, wherein to receive and analyze user response information further includes: retrieve and analyze historic data associated with prior broadcast of content having one or more characteristics in common with the content that is currently broadcasted.

15. The computer-readable media of claim 11, wherein the instructions for adaptive provision of content provide the computing device with an adaptive content provision environment to:

identify at least the first and second crowdsource groups of user devices of the group of user devices based at least in part on the crowd-source analysis and a result of an analysis of historic data associated with the first group of user devices.

16. A computer-implemented method, comprising:

generating and providing for display, by a computing device, a first view of content captured by first selected one or more of a plurality of cameras, to a group of user devices;

receiving and crowdsource-analyzing, by the computing device, user response information comprising eye tracking information provided by the group of user devices in response to the displayed first view of content and identifying at least first and second crowdsource groups of user devices in the group of user devices based on the eye tracking information in the user response information, the analyzing based at least in part on crowdsourcing the user response information; and generating, by the computing device, a second view of content captured by second selected one or more of the plurality of cameras and a third view of content captured by third selected one or more of the plurality of cameras, and displaying, by the computing device, the second view to the first crowdsource group of user devices and the third view to the second crowdsource group of user devices, based at least in part on a result of the crowdsource-analysis of the user response information.

17. The computer-implemented method of claim 16, wherein receiving and crowdsource-analyzing user response information includes:

analyzing, by the computing device, the eye tracking information for an eye movement pattern of at least some of users associated with the user devices; and identifying, by the computing device, one or more gaze points associated with the displayed first view of content, based at least in part on a result of analyzing the eye movement pattern.

18. The computer-implemented method of claim 17, wherein receiving and crowdsource-analyzing user response information includes retrieving and analyzing, by the computing device, historic data associated with prior broadcast of content having one or more characteristics in common with content that is currently broadcasted.

\* \* \* \* \*